United States Patent [19]

Weaver

[11] Patent Number: 4,700,170

[45] Date of Patent: Oct. 13, 1987

[54] CONDITION SENSING RHEOSTAT AND METHOD OF MANUFACTURE

[75] Inventor: Frank C. Weaver, Chicago, Ill.

[73] Assignee: Stewart-Warner Corporation, Chicago, Ill.

[21] Appl. No.: 722,330

[22] Filed: Apr. 12, 1985

[51] Int. Cl.⁴ .................. H01C 10/00; H01C 3/08
[52] U.S. Cl. .................. 338/68; 29/610 R; 338/33; 338/73; 338/147; 338/218
[58] Field of Search .............. 338/33, 68, 71, 73, 338/90, 141, 147, 160, 162, 218, 333, 217, 36, 117, 68, 87; 336/205; 29/610 R, 618

[56] References Cited

U.S. PATENT DOCUMENTS

| | | | |
|---|---|---|---|
| 1,755,314 | 6/1928 | Carter | 338/218 |
| 2,408,092 | 9/1946 | Patterson | 338/218 |
| 2,508,290 | 5/1950 | Poetsch | 338/162 X |
| 2,761,042 | 8/1956 | Scott | 338/333 |
| 3,541,682 | 11/1970 | Hildebrandt | 336/205 X |

Primary Examiner—Patrick R. Salce
Assistant Examiner—Jane K. Lau
Attorney, Agent, or Firm—A. G. Douvas; D. V. Allen

[57] ABSTRACT

A wound wire rheostat for a fuel level sender or other condition sensor and its method of manufacture, that eliminate wire snapping by heat staking selected portions of the wire into its plastic support board.

8 Claims, 8 Drawing Figures

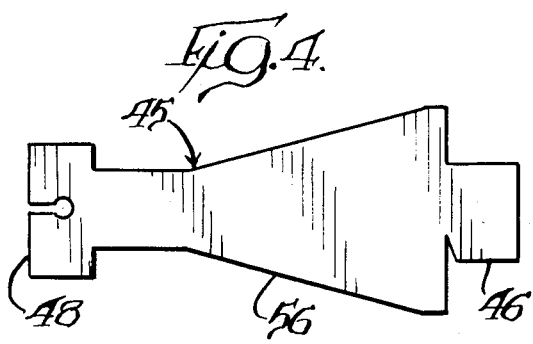
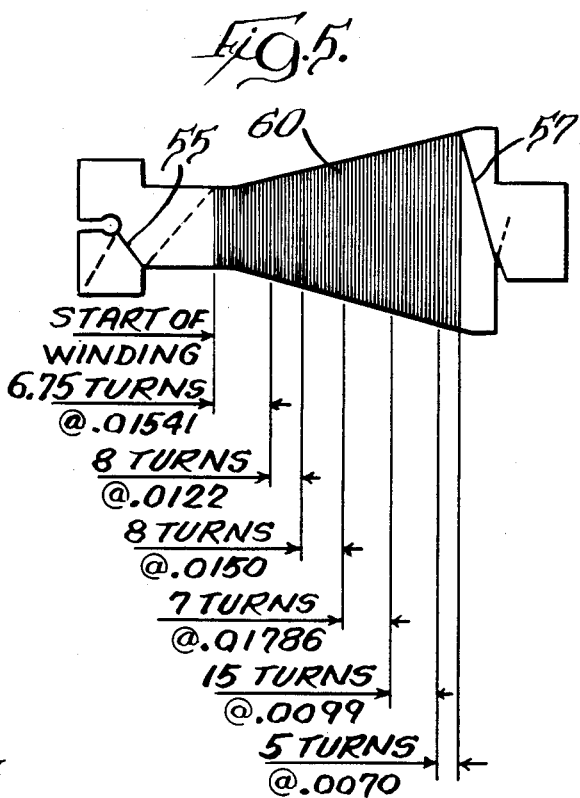
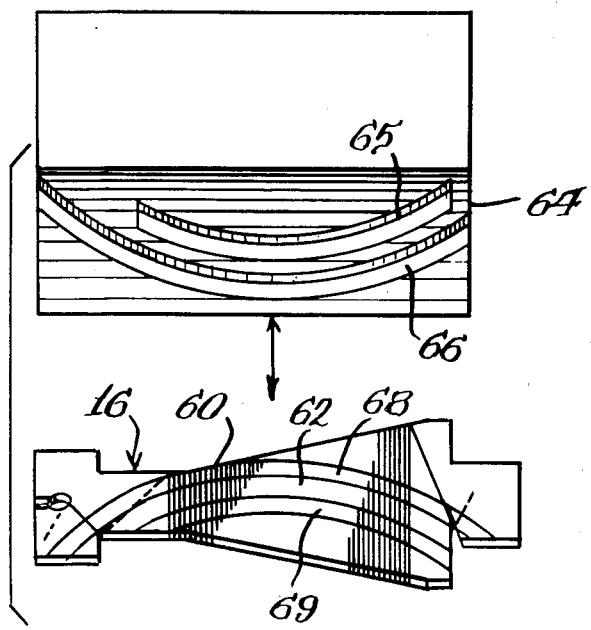
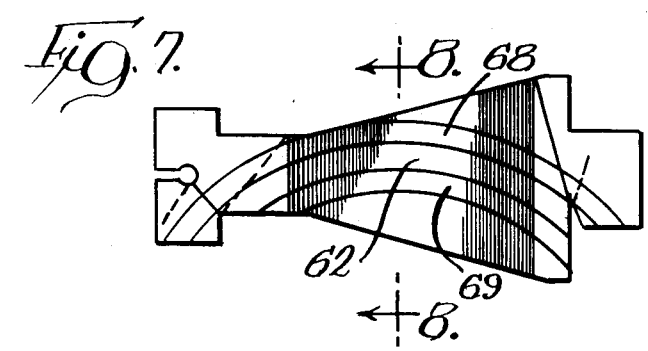
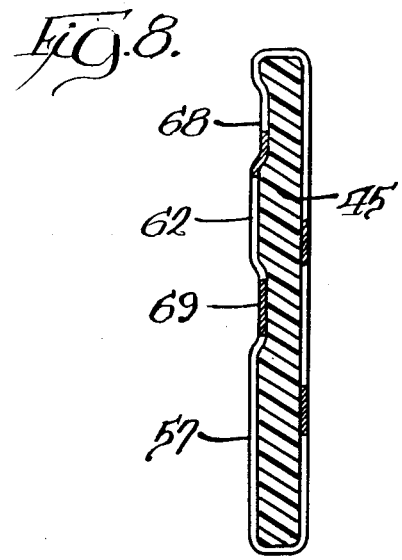

CONDITION SENSING RHEOSTAT AND METHOD OF MANUFACTURE

BACKGROUND OF THE INVENTION

Vehicular fuel level senders, as they are commonly called, are actually transducers that convert the level of fuel in the fuel tank to an electric signal to proportionally drive a visually readable electric instrument such as a bitorque gauge. These fuel senders conventionally include a float caried on the end of a long pivoting arm suspended within the interior of the fuel supply tank, and this arm pivots a short wiper blade having a ball contact slidably engaging the wires on a wound wire rheostat that varies in resistance in accordance with the position of the float and hence liquid level, however not always in directly proportional fashion. The angular position of the pivoting float arm, or more particularly the incremental angle of the arm is not directly proportional to vertical incremental change in the float position and hence not directly proportional to liquid level. Moreover, in some cases the instrument itself is not proportional throughout its range and requires some compensation, and in other cases the tank itself may be irregular in configuration.

The rheostat, and more particularly the wire conductive winding on the rheostat, provides a convenient location for compensating for these non-linearities usually in one of two, or both, ways. The first is to vary the spacing between the wire turns and more specifically by increasing wire turn spacing the ratio of resistance change to float arm angle change decreases, and conversely it increases with more tightly wound turns. Another common way of varying linearity is to change the individual turn lengths by varying the shape of the support board on which the wire is wound. One common shape variation includes a tapered section in the form of a frusto-isosceles triangle.

This differential wire turn spacing as well as the wire turn length variation has created a problem because the wiper contact as it rides across the wire turns tends to pluck or "banjo" the loosely-held wires and not infrequently causes rupture of the wire, which of course results in a complete failure in the rheostat.

One way to minimize this wire banjoing effect is to glue the wires to the board with epoxy by applying an epoxy adhesive to the board, then wind the wire over the pre-coated board, and thereafter cure the epoxy in an oven. This is an extremely difficult process to control, particularly with respect to limiting the areas to which glue is applied, and of course the epoxy around the wire windings can insulate the wire and destroy the electrical output of the rheostat. Moreover this is an extremely costly method of manufacture.

Another attempt at solving this wire plucking problem has been to mold projections on the rheostat support board similar to the bridge of a stringed musical instrument; however, the bridges tend to stretch the wire windings so that they are over-tensioned which actually increases the likelihood of rupture. It has also been found difficult to reliably wind the wire on these rather exacting projections.

It is a primary object of the present invention to ameliorate the problems noted above with rheostats in fuel level sender assemblies.

SUMMARY OF THE PRESENT INVENTION

In accordance with the present invention, a rheostat for a fuel level sender is provided that includes an elongated triangular plastic base board wound with conductive wire against which an electrical contact on a pivoting wiper blade slides to vary the resistive output of the rheostat in accordance with the pivotal position of a float arm connected to drive the wiper blade. The problem of the wiper contact snapping, stretching ad sometimes rupturing the wire is eliminated by heat staking the wires to the plastic support board on both sides of the path of engagement between the wiper contact and the wires.

This heat staking embeds the wires in the plastic base board on both sides of the wiper contact path, rendering the wire portion taut but not stretched in the path of wiper contact engagement. The portion of each turn in the path of contact is completely above the surface of the plastic base providing improved electrical contact over previous methods of attempting to solve this problem, particularly over the gluing method.

The heat staking process according to the present invention is implemented by a heat staking tool or die that has spaced parallel arcuate projections. After winding the wire on a tapered central portion of the plastic support board, the heat staking tool is properly aligned with the active surface of the rheostat with the arcuate projections, which have the same center of curvature as the wiper contact path, flanking the path of contact of the wiper contact on the wire turns. The tool is then brought into contact with the rheostat and these arcuate projections heat the plastic board and simultaneously force the underlying wire portions into the softened plastic areas without embedding the wire portions directly in the contact path in the board. As this is done, the wires dig slightly into the edges of the plastic support so that there is no significant wire stretching at the contact path portion of the wires. Heat staking proceeds at approximately 315 degrees F. for approximately 20 seconds, but can also proceed at a lower temperature with a slightly longer active staking time.

Each of the embedded arcuate strips in the board is closely spaced, on the order of 0.045 inches from the point of the wiper contact with the wire turns, each is approximately 0.140 inches wide and on the order of 0.003 to 0.008 inches in depth.

It should be understood that the principles of the present invention can be applied to a variety of condition sensors in addition to fuel level senders, such as pressure sensors.

BRIEF DESCRIPTION OF THE DRAWINGS

FIG. 4 is a plan view of a rheostat support board according to the present invention;

FIG. 5 is a plan view of a wound wire rheostat according to the present invention;

FIG. 6 is an exploded view of the rheostat subassembly and heat staking tool according to the present invention just after heat staking;

FIG. 7 is a plan view of the rheostat sub-assembly after heat staking; and

FIG. 8 is an enlarged cross-section of the completed rheostat taken generally along line 8—8 of FIG. 7.

DETAILED DESCRIPTION OF THE PREFERRED EMBODIMENT

Figure 1:
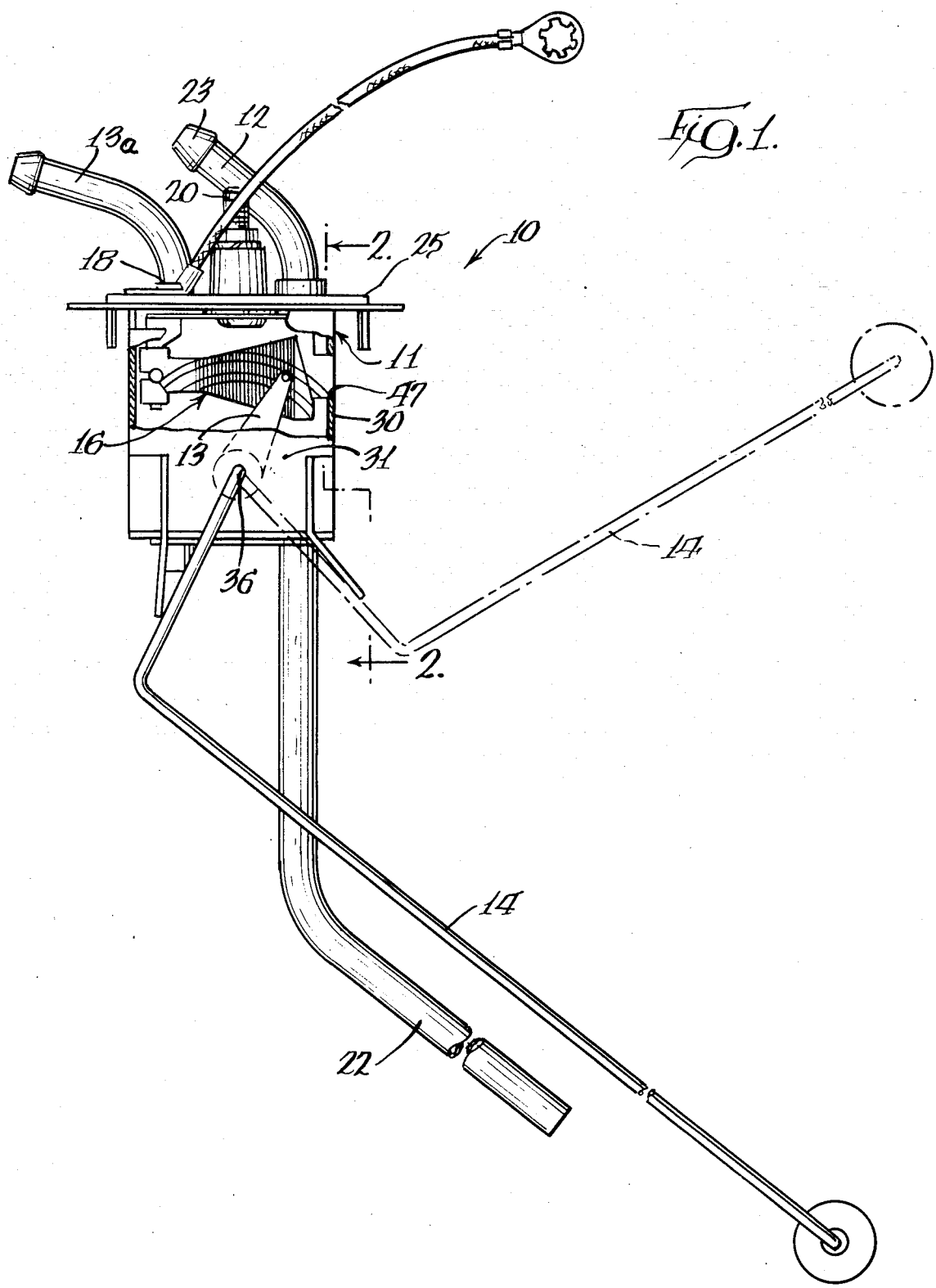
FIG. 1 is a front view of a fuel level sender incorporating a rheostat according to the present invention.
Figure 2:
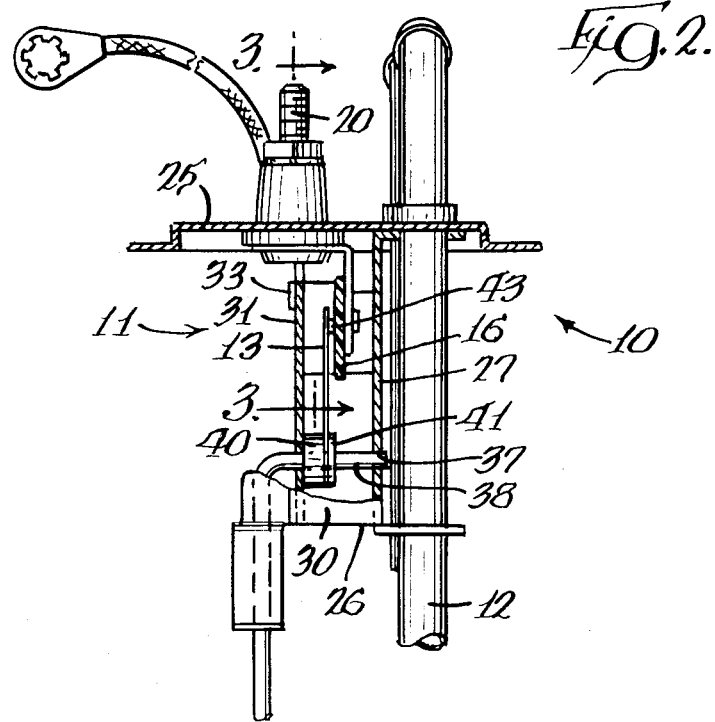
FIG. 2 is a fragmentary side view of the fuel sender illustrated in FIG. 1 taken generally along line 2—2 therein.
Figure 3:
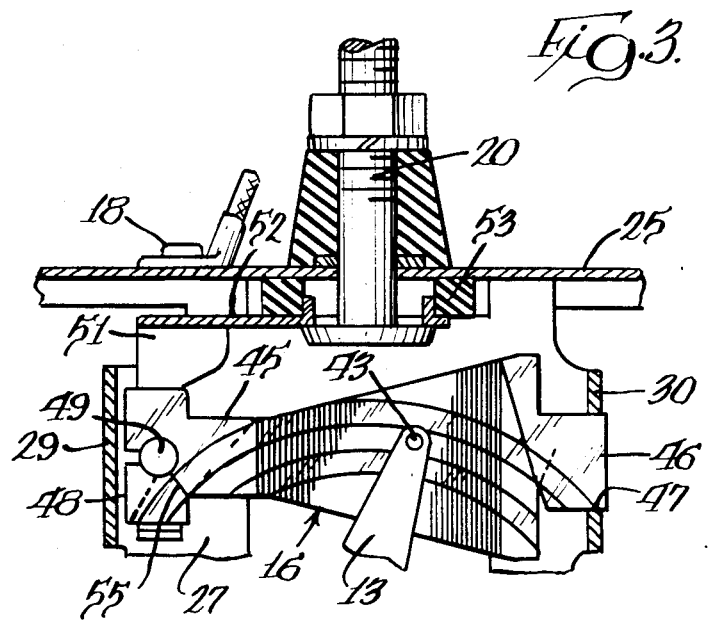
FIG. 3 is a fragmentary section of the fuel sender taken generally along line 3—3 of FIG. 2.

Viewing FIGS. 1 to 3, a fuel sender 10 is illustrated consisting generally of a frame 11 adapted to be mounted in an opening in a fuel supply tank, a fuel outlet tube 12, a fuel inlet tube 13a, a float arm 14 pivoted in the frame 11, a wiper blade 13 driven by the float arm having sliding contact with the forward face of rheostat 16, ground terminal 18 electrically connected to frame 11 by welding, and an instrument terminal 20 connectable to drive a fuel level indicator within the associated vehicle.

The outlet tube 12 has a lower end 22 that extends into the lower portion of the associated supply tank, and it has an outlet fitting portion 23 extending exteriorly of the tank adapted to be connected to the vehicle's fuel pump inlet. The fuel pump recirculates a portion of the fuel and this returns to the tank through inlet tube 13a.

As the fuel level within the tank lowers from full to empty, float arm 14 moves from its upper dotted line position illustrated in FIG. 1 to its full line position driving the wiper arm 13 in a counter-counterclockwise direction increasing the effective resistance of rheostat 16 since the left side of the rheostat is positive and wiper 13 is connected to ground 18.

As seen more clearly in FIGS. 2 and 3, the frame generally indicated by the reference numeral 11 includes an upper circular support flange 25 adapted to be connected over an opening in the fuel supply tank with the lower portion of the frame suspended within the tank. A channel-shaped housing member 26 is fixed to the flange 11 and includes a rear wall 27 and forwardly extending side walls 29 and 30. A frame front wall 31 is held in position by tabs 33 formed with the side walls 29 and 30 and bent over the forward surface of front wall 31.

The upper end of the float arm is bent horizontally and extends through, and is supported in spaced apertures 36 and 37 in the front and rear walls 31 and 27 respectively, and defines a pivot shaft 38. Spaced bushings 40 and 41 are pressed on the pivot shaft 38 and clamp against and support the nickel plated phosphor-bronze wiper blade 13 that has a contact ball 43 at its distal end biased into engagement with the rheostat 16.

Rheostat 16 includes an elongated flat support board 45 constructed of a thermoplastic material such as one of the acetal copolymers or acetal homopolymers. Plastics that have been found to be acceptable for this purpose include "Celcon" by Celanese Corp. and "Delrin" by Dupont Corp. Board 45 has a rectangular tab 46 that extends into a slot 47 (see FIG. 1) in frame side wall 30 to support the right end of the rheostat as seen in FIG. 3, and it has a left tab portion 48 riveted at 49 to an "L" shaped bracket 51 having a horizontal upper portion 52 held against an insulating washer 53 by threaded terminal stud 20. The wire winding on the rheostat has one end 55 connected to conductive rivet 49, which is electrically connected to terminal stud 20 through conductive bracket 51. The wiper arm 13 is connected to ground 18 through the conductive frame 11.

As seen in FIG. 4 the rheostat board 45 has a central frusto-isosceles portion 56 and this central portion is wound with a single conductive wire 57 on the order of 60 mm. The board 45 is approximately 0.025 to 0.060 inches thick. As seen in FIG. 5 the spacing between the winding turns 60 varies across the board portion 56 to achieve the necessary linearity between float position and instrument reading, and it should be noted that this usually requires the turns near the center of the winding 60 to be the loosest, e.g. as shown seven turns near the center at 0.01786 inches spacing between the turns.

As seen best in FIGS. 6, 7 and 8, an arcuate strip 62 on the windings 60 defines the path of travel and contact of the wiper ball 43 with the winding 60. This strip 62 is approximately 0.090 inches wide. Wiper ball 43 engages the center line of strip 62 and has a diameter somewhat less than the 0.090 inches strip width.

Portions of the winding 60 are embedded in the plastic board 45 by a heat staking tool 64 that has spaced arcuate projections 65 and 66 each having a center of curvature defined by the axis of pivot shaft 38, and they are spaced from one another by the width of the path strip 62 on the winding.

Each of the projections 65 and 66 is on the order of 0.140 inches in width but, however, they may be consideralby wider toward the outside of the board 45 to increase the embedded area of the wire in the board 45 if desired.

The heat staking tool, after proper alignment over the rheostat 16 and as seen in FIG. 6, is brought into contact with the active surface of the rheostat with the projections 65 and 66 aligned with and flanking the wiper contact path 62. The heat staking process takes place at approximately 315 degrees F. for about 20 seconds, although somewhat lower temperatures can be used with longer cycle times. The tool presses and heats the rheostat until arcuate embedded area 68 and 69 (conforming in shape to projections 65 and 66) have a depth of 0.004 to 0.008 inches and extend entirely across the winding 60. It should be noted that this process results in the wire 57 being completely embedded in the board 45 in the areas 68 and 69, but not embedded in the path area 62. The heat staking process under these conditions renders the portion of the turns over area 62 taut without stretching.

While the embodiment of the present rheostat shown in the drawings and described above is tapered with unevenly spaced windings, it should be understood that many of the principles of the present invention can be applied to untapered rheostats and rheostats with evenly spaced windings.

I claim:

1. A method of making a rheostat for a liquid level indicating system that includes a liquid level driven wiper that slides across a predetermined path on the rheostat to vary the effective resistance thereof, including the steps of: forming an elongated plastic support board having a grooveless flat forward surface, winding a conductive wire transversely around the support board in a plurality of turns, heating the board so that the areas of the board closely adjacent and along the path of the wiper become deformable, and pressing the wire turns selectively into the deformable board areas on its forward surface embedding the wire turns in the board only in the area of the board forward surface closely adjacent the path without embedding the wire in the path, thereby minimizing lateral movement of the wire turns as the wiper slides across the turns.

2. A method of making a rheostat for a liquid level indicating system as defined in claim 1, wherein the steps of heating the board areas and pressing the wire turns into the areas is effected simultaneously by a heat staking tool with spaced longitudinally extending parallel projections.

3. A method of making a rheostat for a liquid level indicating system that includes a liquid level driven wiper that slides across a predetermined path on the rheostat to vary the effective resistance thereof, including the steps of: forming an elongated plastic support board having a grooveless flat forward surface, winding a conductive wire transversely around the support board in a plurality of turns, with varying spacing between the turns, heat staking the wires into the board in two parallel spaced areas on the forward surface closely adjacent but spaced from the path of contact of the wiper with the wire so the path of contact remains unstaked.

4. A method of making a rheostat as defined in claim 3, wherein the step of heat staking the wires into the board includes staking them in parallel areas that are arcuate in configuration to accommodate a pivotally mounted wiper.

5. A method of making a rheostat for a liquid level indicating system that includes a liquid level driven wiper that slides across a predetermined path on the rheostat to vary the effective resistance thereof, including the steps of: forming an elongated flat plastic support board with a tapered central portion and a grooveless flat forward surface, winding a conductive wire around the tapered central portion in a plurality of turns in each of a plurality of axially extending sections with each section having different spacing between the wire turns, said wiper engaging the wire turns in a predetermined arcuate path, and heat staking the wires into the board in two areas defined by two parallel arcuate strips on the forward surface of the board, closely flanking the wiper arcuate path across the wire turns without embedding the wire turns on the path into the board, whereby the wire turns in the path are taut without stretching to eliminate significant lateral twanging of the wires caused by wiper movement particularly in the more widely spaced turn sections.

6. A rheostat for use in a liquid level indicating system where a wiper arm engages and slides across the rheostat to vary the resistance thereof, comprising: an elongated homogeneous plastic support board having a flat forward surface, and a wire wound around the flat board in a plurality of transverse turns, said turns having a prdetermined defined path on the forward surface of the board along which the wiper engages the wire, the wire turns in the area of the board forward surface closely adjacent the path of engagement of the wiper being selectively embedded in the forward surface of the homogeneous board itself to provide the sole lateral support for the turns on the board forward surface without the portion of the wire turns in the path being embedded so that the wire turns are tensioned across the path on the forward surface of the board to thereby minimize lateral movement of the wire turns as the wiper slides across the turns, said wire turns on the forward surface of the board being uncoated with any adhesive.

7. A rheostat for use in a liquid level indicating system as defined in claim 6, wherein the board has a tapered central portion and wire is wound around the central portion in a plurality of sections each having different spacing between the turns, said path of engagement of the wiper with the wire turns being arcuate, said area where the wires are embedded being spaced arcuate narrow areas on the forward surface of the board flanking and closely spaced from the path of engagement of the wiper.

8. A rheostat for use in a liquid level indicating system where a wiper arm engages and slides across the rheostat to vary the resistance thereof, comprising: an elongated homogeneous plastic support board having a flat forward surface, the board having a tapered central portion and a wire is wound in turns around the central portion of the flat board in a pluraltiy of sections each having different spacing between the turns, said wiper having a fixed narrow arcuate path of engagement with the turns on the forward surface of the board, said wire turns being directly embedded in the flat plastic board forward surface in two areas extending along said path, to provide the sole lateral support for the turns on the board forward surface, said areas wherein the wire turns are embedded being spaced arcuate narrow areas on the forward surface flanking and closely spaced from the path of engagement of the wiper, said wire turns in the path engaging but not embedded in the board, whereby the wire turns in the path are taut without stretching to eliminate significant lateral twanging of the wires caused by wiper movement particularly in the widely spaced turn sections, said wire turns on the forward surface of the board being uncoated with any adhesive.

* * * * *